(12) United States Patent
Chen et al.

(10) Patent No.: US 10,752,199 B2
(45) Date of Patent: Aug. 25, 2020

(54) VEHICLE AIRBAGS FOR OCCUPANTS IN REAR FACING SEATS

(71) Applicant: Ford Global Technologies, LLC, Dearborn, MI (US)

(72) Inventors: Huipeng Chen, Canton, MI (US); Robert William McCoy, Ann Arbor, MI (US); Agnes S. Kim, Dearborn, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 16/165,621

(22) Filed: Oct. 19, 2018

(65) Prior Publication Data

US 2020/0122674 A1 Apr. 23, 2020

(51) Int. Cl.
| | |
|---|---|
| *B60R 21/231* | (2011.01) |
| *B60R 21/0136* | (2006.01) |
| *B60R 21/207* | (2006.01) |
| *B60R 21/233* | (2006.01) |
| *B60R 21/2338* | (2011.01) |

(52) U.S. Cl.
CPC ........ *B60R 21/231* (2013.01); *B60R 21/0136* (2013.01); *B60R 21/207* (2013.01); *B60R 21/233* (2013.01); *B60R 21/2338* (2013.01); *B60R 2021/23316* (2013.01); *B60R 2021/23382* (2013.01)

(58) Field of Classification Search
CPC . B60R 21/231; B60R 21/233; B60R 21/0136; B60R 21/207; B60R 21/2338; B60R 2021/23382; B60R 2021/23316
See application file for complete search history.

(56) References Cited

U.S. PATENT DOCUMENTS

| | | | |
|---|---|---|---|
| 9,981,622 B2 | 5/2018 | Ohmura | |
| 9,994,181 B1 | 6/2018 | Dubaisi et al. | |
| 2006/0055153 A1* | 3/2006 | Hirata | ................ B60N 2/42709 280/728.1 |
| 2016/0272141 A1* | 9/2016 | Ohmura | ................... B60R 21/16 |
| 2017/0291564 A1 | 10/2017 | Ohmi et al. | |
| 2019/0016294 A1* | 1/2019 | Hayashi | ............ B60R 21/01554 |
| 2019/0111880 A1* | 4/2019 | Choi | ..................... B60R 21/205 |

FOREIGN PATENT DOCUMENTS

| | | |
|---|---|---|
| DE | 102014213296 A1 | 1/1916 |
| DE | 102016216329 A1 | 3/1918 |

* cited by examiner

*Primary Examiner* — Drew J Brown
(74) *Attorney, Agent, or Firm* — Frank A. MacKenzie; Bejin Bieneman PLC

(57) ABSTRACT

Method and apparatus are disclosed for vehicle airbags for occupants in rear-facing seats. An example vehicle includes an instrument panel, a rear-facing seat adjacent the instrument panel and including a seatback and a headrest, and an airbag including a lower portion and an upper portion. When undeployed, the airbag is stored in the instrument panel. When the airbag deploys, the lower portion presses onto a back of the seatback and the upper portion presses onto a back of the headrest.

16 Claims, 3 Drawing Sheets

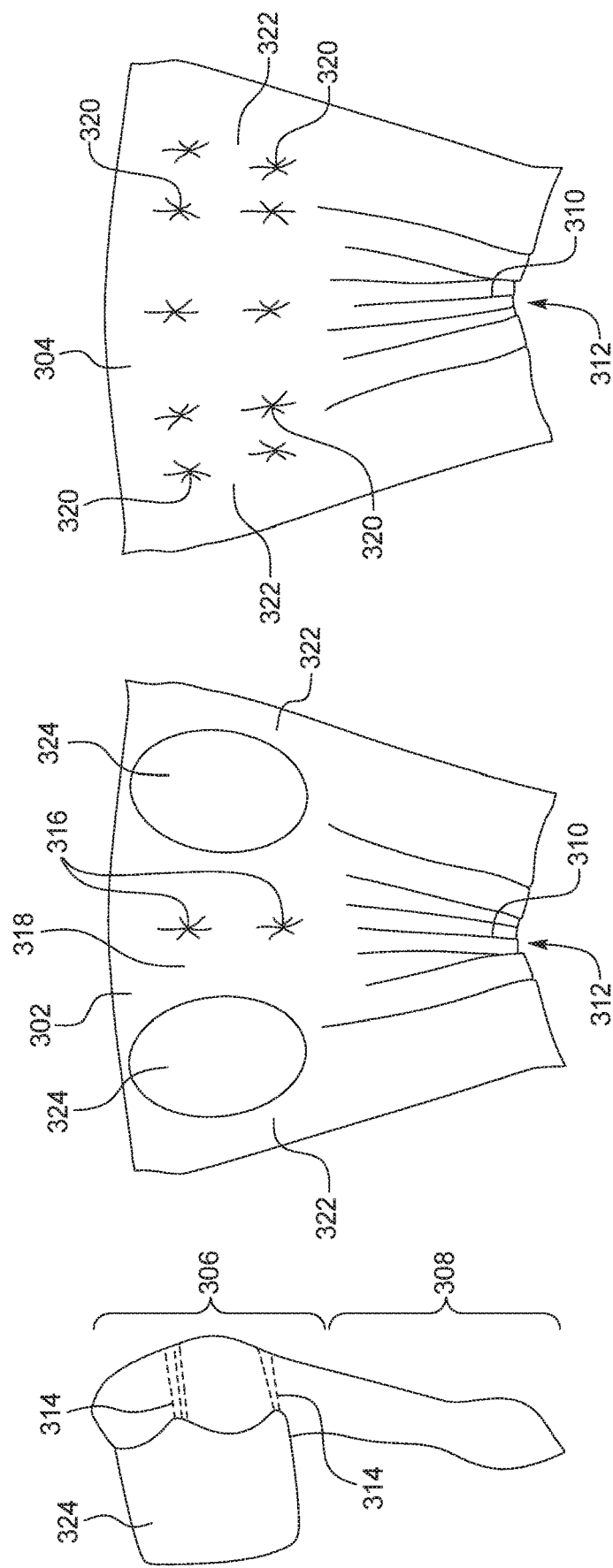

VEHICLE AIRBAGS FOR OCCUPANTS IN REAR FACING SEATS

TECHNICAL FIELD

The present disclosure generally relates to airbags and, more specifically, to vehicle airbags for occupants in rear-facing seats.

BACKGROUND

Typically, a vehicle includes safety features to reduce risk-of-injury to occupant(s) in the event that the vehicle is involved in a collision (e.g., with another vehicle). For instance, a vehicle includes seatbelt pretensioners, webclamps, airbags, and/or other safety features that are designed to restrain occupants within their respective seats to reduce the risk-of-injury to the occupants. For instance, a seatbelt pretensioner is configured to remove slack from a seatbelt. A webclamp is configured to clamp webbing of the seatbelt to limit a length of the seatbelt from the web spool. An airbag is configured to deploy in certain crashes to restrain movement of an occupant of a corresponding seat.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle airbags for occupants in rear-facing seats. An example disclosed vehicle includes an instrument panel, a rear-facing seat adjacent the instrument panel and including a seatback and a headrest, and an airbag including a lower portion and an upper portion. When undeployed, the airbag is stored in the instrument panel. When the airbag deploys, the lower portion presses onto a back of the seatback and the upper portion presses onto a back of the headrest.

In some examples, when the airbag deploys during a collision, the lower portion presses onto the back of the seatback to reduce acceleration of an upper body of an occupant and the upper portion presses onto the back of the headrest to reduce rotation of a head of the occupant. In some examples, the airbag is configured to deploy onto a back of the rear-facing seat for at least one of a front collision and a frontal oblique collision.

In some examples, the airbag deploys onto a back of the rear-facing seat to deter the airbag from deploying onto an occupant. In some such examples, by deploying onto the back of the rear-facing seat, the airbag is able to deploy earlier at an increased velocity to further restrain the occupant during a collision.

In some examples, the airbag includes sewn lines that extend between a front and a back of the airbag along a center section of the lower portion. The sewn lines constrain a thickness of the center section of the lower portion to reduce acceleration of an upper body of an occupant during a collision.

In some examples, the airbag includes tethers between a front and a back of the upper portion, the tethers constrain a thickness of the upper portion to control head kinematics of an occupant during certain collisions. In some such examples, the tethers include central tethers located within a center section the upper portion. The central tethers constrain a thickness of the center section of the upper portion to control the head kinematics of the occupant during certain front collisions. In some such examples, the tethers include side tethers on each side of the upper portion. The side tethers constrain thicknesses of side sections to control lateral head kinematics of the occupant during a frontal oblique collision.

In some examples, the airbag includes protrusions extending from each side of a front the upper portion. The protrusions extend beyond the headrest to control lateral head kinematics of an occupant during a frontal oblique collision.

Some examples further include a restraint control module that controls deployment of the airbag. Some such examples further include at least one of an inertial measurement unit, an accelerometer, and a pressure sensor to detect a collision. The restraint control module deploys the airbag in response to detecting the collision.

An example disclosed autonomous includes a rear-facing seat for an occupant that includes a seatback and a headrest and an airbag including a lower portion and an upper portion. When the airbag deploys, the lower portion contacts a back of the seatback to reduce acceleration of an upper body of the occupant and the upper portion contacts a back of the headrest to control head kinematics of the occupant.

Some examples further include a restraint control module that deploys the airbag for a front collision or a frontal oblique collision. In some examples, when the airbag deploys, the lower portion presses onto the back of the seatback to reduce the acceleration of the upper body of the occupant and the upper portion presses onto the back of the headrest to control the head kinematics of the occupant.

In some examples, the airbag includes sewn lines that extend between a front and a back of the airbag along a center section of the lower portion. The sewn lines constrain a thickness of the center section to reduce the acceleration of the upper body of the occupant during a collision. In some examples, the airbag includes tethers between a front and a back of the upper portion. The tethers constrain a thickness of the upper portion to control the head kinematics of the occupant during certain collisions. In some examples, the airbag includes protrusions extending from each side of a front of the upper portion. The protrusions extend beyond the headrest to control lateral head kinematics of the occupant during a frontal oblique collision.

An example disclosed airbag for a seat having a seatback and a headrest includes a front and a back. The example disclosed airbag also includes a lower portion to deploy onto the seatback and including sewn lines extending between the front and the back. The example disclosed airbag also includes an upper portion to deploy onto the headrest. The upper portion includes tethers extending between the front and the back. The upper portion includes protrusions protruding from the front of the upper portion and extending beyond the headrest when deployed.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 3A is a side view of the airbag of FIG. 2.

FIG. 3B is a front view of the airbag of FIG. 2.

FIG. 3C is a rear view of the airbag of FIG. 2.

DETAILED DESCRIPTION OF EXAMPLE EMBODIMENTS

Figure 1:
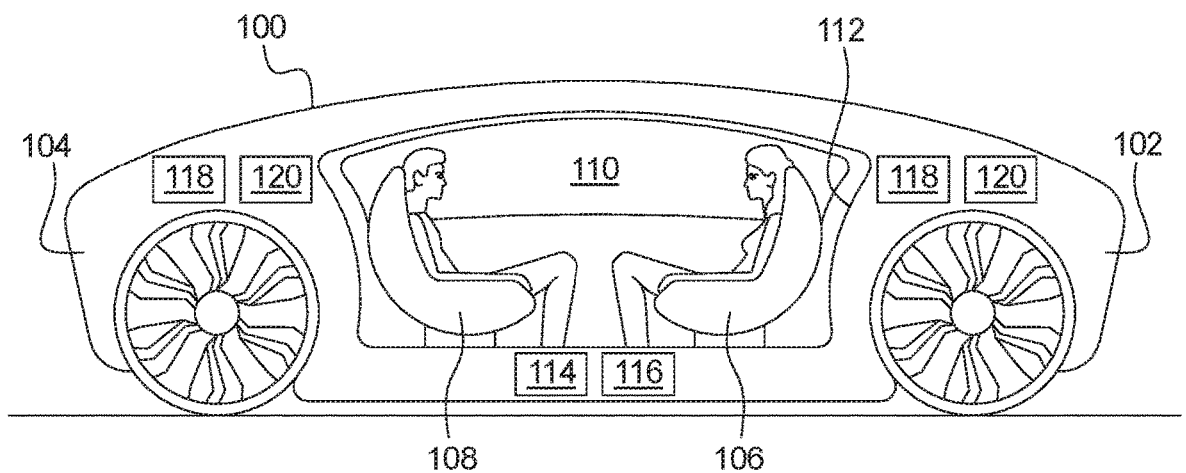
FIG. 1 illustrates an example vehicle with a rear-facing seat in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, a vehicle includes safety features to reduce risk-of-injury to occupant(s) in the event that the vehicle is involved in a collision (e.g., with another vehicle). For instance, a vehicle includes seatbelt pretensioners, webclamps, airbags, and/or other safety features that are designed to restrain occupants within their respective seats to reduce the risk-of-injury to the occupants. For instance, a seatbelt pretensioner is configured to remove slack from a seatbelt. A webclamp is configured to clamp webbing of the seatbelt to limit a length of the seatbelt from the web spool. An airbag is configured to deploy to restrain movement of an occupant of a corresponding seat.

Typically, a vehicle includes front-facing seats in which occupants of those seats face a front of the vehicle. Recently, some vehicles (e.g., fully autonomous vehicles) include rear-facing seats in which occupants of those seats face a rear of the vehicle. In some instances, safety features of vehicles are configured to restrain occupants based on forces and/or other characteristics that are specific to front-facing seats. In turn, those safety features potentially may not securely restrain occupants seated in rear-facing seats.

Examples disclosed herein include an airbag system that reduces risk-of-injury to an occupant seated within a rear-facing seat (e.g., a first-row rear-facing seat) of a vehicle (e.g., an autonomous vehicle). The airbag system controls deployment of an airbag (e.g., a mushroom-shaped airbag) for the rear-facing seat that is stored within a panel (e.g., an instrument panel) of the vehicle when undeployed. The example airbags disclosed herein include a lower portion and an upper portion. Upon deployment, the lower portion engages a back of the seat to cushion an impact between the rear-facing seat and the panel, thereby reducing risk-of-injury to an occupant caused by high acceleration of his or her upper body. The upper portion deploys into a mushroom-shaped bag that engages the back of a headrest of the rear-facing seat to deter head rotation of the occupant (also referred to as whiplash), thereby reducing risk-of-injury to the neck and/or head of the occupant. Additionally or alternatively, the airbag system is configured to reduce a risk-of-injury to an occupant seated within a rear-row, front-facing seat of a vehicle when the airbag is stored in a panel behind the rear-row, front-facing seat.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. In the illustrated example, the vehicle 100 is autonomous (e.g., motive functions are controlled by the vehicle 100 without direct driver input). In other examples, the vehicle 100 is non-autonomous (e.g., motive functions are controller by a driver) and/or semi-autonomous (e.g., some routine motive functions controlled by the vehicle 100).

In the illustrated example, the vehicle 100 includes a front side 102 and a rear side 104 opposite the front side 102. Further, the vehicle 100 of the illustrated example includes a rear-facing seat 106 and a front-facing seat 108 within a cabin 110 of the vehicle 100. As used herein, a "front-facing seat" refers to a seat of a vehicle that is oriented such that an occupant faces a front of a vehicle when securely positioned on the seat. As used herein, a "rear-facing seat" refers to refers to a seat of a vehicle that is oriented such that an occupant faces a rear of a vehicle when securely positioned on the seat.

In the illustrated example, the rear-facing seat 106 is a front-row, rear-facing seat. In other examples, the rear-facing seat 106 is a secondary-row, rear-facing seat. Further, the vehicle 100 of FIG. 1 includes a panel 112 that is adjacent to the rear-facing seat 106. More specifically, the panel 112 is next to a back side of the rear-facing seat 106. In the illustrated example, the panel 112 is an instrument panel (also referred to as a dashboard) that is positioned toward a front of the cabin 110 and includes input device(s) and/or output displays to facilitate an occupant in controlling one or more vehicle settings (e.g., HVAC settings, infotainment features, etc.).

Further, the vehicle 100 of the illustrated example includes a restraint control module 114 and one or more impact sensors. For example, the restraint control module 114 is an electronic control unit (ECU) that is configured to (1) detect when the vehicle 100 is involved in a collision event and/or a hard braking event and (2) deploy safety device(s) to restrain position(s) of occupant(s) within the vehicle 100 upon detecting a collision event. For example, upon detecting that the vehicle 100 is involved in a collision event and/or a hard braking event, the restraint control module 114 deploys airbag(s) (e.g., an airbag 200 of FIG. 2), activates seatbelt pretensioner(s), and/or activates webclamp(s) to restrain the occupant(s) within the cabin 110 of the vehicle 100. That is, the restraint control module 114 is configured to control deployment of airbag(s), seatbelt pretensioner(s), webclamp(s), and/or other safety device(s) of the vehicle 100 upon detection of a front, rear, and/or oblique collision.

The restraint control module 114 of the illustrated example determines whether the vehicle 100 is involved in a collision event based on data collected by one or more impact sensors of the vehicle 100. That is, the impact sensor(s) are configured to detect when the vehicle 100 is involved in a collision. In the illustrated example, the impact sensors of the vehicle 100 includes an inertial measurement unit 116, one or more accelerometers 118, and one or more pressure sensors 120. For example, the inertial measurement unit 116 includes one or more sensors (e.g., an accelerometer, a tilt sensor, etc.) that are configured to detect an occurrence, location, and/or severity of a collision event of the vehicle 100 by monitoring characteristics of the vehicle 100, such as a longitudinal acceleration, a latitudinal acceleration, a yaw rate, a pitch rate, a roll rate, etc. The accelerometers 118 are configured to measure accelerations and/or vibrations of the vehicle 100 to monitor for an occurrence, location, and/or severity of a collision event of the vehicle 100. Further, the pressure sensors 120 are located along a body and/or within doors of the vehicle 100. The pressure sensors 120 are configured to measure changes in pressure and/or vibrations of adjacent portions of the vehicle 100 to monitor for an occurrence, location, and/or severity of a collision event of the vehicle 100.

Figure 2:
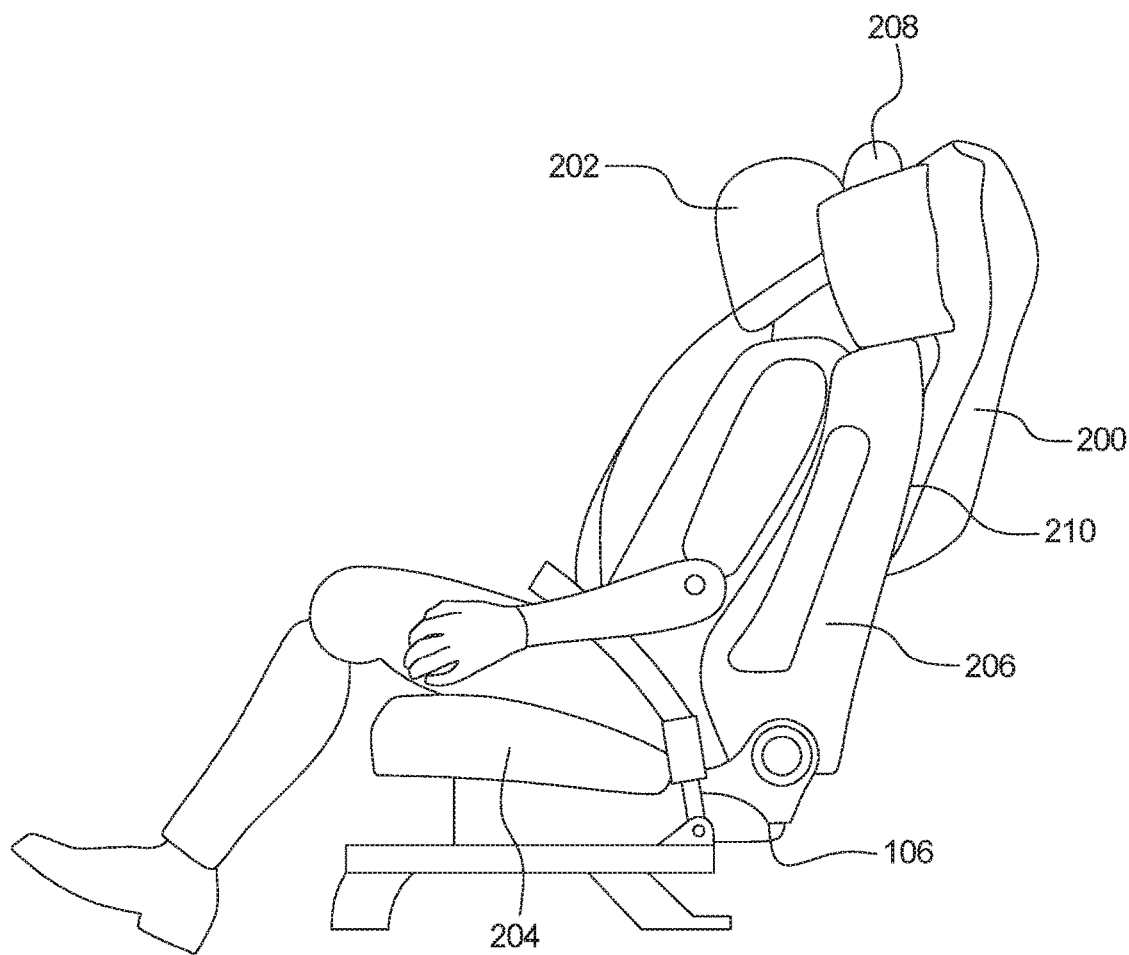
FIG. 2 illustrates an example airbag for the rear-facing seat of FIG. 1 in accordance with the teachings herein.

FIG. 2 illustrates an example airbag 200 for an occupant 202 seated in the rear-facing seat 106 in accordance with the teachings herein. Additionally or alternatively, the airbag 200 is configured for an occupant seated in a rear-row, front-facing seat (e.g., the front-facing seat 108). As illustrated in FIG. 2, the rear-facing seat 106 includes a seat cushion 204, a seatback 206, and a headrest 208. The seat cushion 204 is a substantially horizontal portion of the rear-facing seat 106 that is configured to be sat on by the occupant 202. The seatback 206 is a substantially vertical portion of the rear-facing seat 106 that is configured to support a back of the occupant 202. Further, the headrest 208 is a substantially vertical portion of the rear-facing seat 106 that is located above the seatback 206 and configured to support a head of the occupant 202.

In the illustrated example, the airbag 200 is fully deployed. When the airbag 200 is undeployed, the airbag 200 of the illustrated example is stored in the panel 112. That is, the airbag 200 deploys from the panel 112. As illustrated in FIG. 2, the airbag 200 is configured to deploy onto a back 210 of the rear-facing seat 106 and/or the front-facing seat 108 in response to the restraint control module 114 detecting that a front, oblique, and/or rear collision of the vehicle 100. For example, the airbag 200 deploys onto the back 210 of the rear-facing seat 106 to deter the airbag 200 from deploying directly onto the occupant 202 to potentially increase the effectiveness of the airbag 200 in reducing injury of the occupant 202 during a collision.

In the illustrated example, the airbag 200 reduces risk-of-injury to the occupant 202 if and when the occupant 202 is out-of-position (i.e., not in a nominal seated position). For instance, if an airbag is deployed directly onto an occupant that is out-of-position, the out-of-position pre-positioning of the occupant before a crash could potentially increase the likelihood of the force at which the airbag contacts the occupant resulting in an injury to the occupant. In the illustrated example, the airbag 200 deploys directly onto the back 210 of the rear-facing seat 106 (i.e., not directly onto the occupant 202) to reduce the risk-of-injury to the occupant 202 if and when the occupant 202 is out-of-position. Additionally or alternatively, the airbag 200, when stored behind a rear-row, front-facing seat (e.g., the front-facing seat 108), is configured to deploy directly onto a back of the rear-row, front-facing seat to reduce the risk-of-injury to an occupant if and when the occupant is out-of-position.

Further, the airbag 200 deploying onto the back 210 of the rear-facing seat 106 enables the airbag 200 to be deployed earlier and/or at an increased velocity to further restrain the occupant 202 during a collision. For instance, when an airbag 200 is configured to be deployed directly onto a front of an occupant, the deployment time may be delayed and/or the deployment force may be moderated to potentially reduce the risk of the airbag deployment resulting in injury to the occupant. In the illustrated example, the airbag 200 deploys directly onto the back 210 of the rear-facing seat 106 (i.e., not directly onto the occupant 202) to enable the airbag 200 to be deployed earlier and/or at an increased velocity upon detection of a vehicle collision, thereby increasing the effectiveness of the airbag 200 in restraining the occupant 202 during the collision. Additionally or alternatively, the airbag 200, when stored behind a rear-row, front-facing seat (e.g., the front-facing seat 108), is configured to be deployed earlier and/or at an increased velocity upon detection of a vehicle collision.

FIGS. 3A-3C further depict the airbag 200 for the rear-facing seat 106. More specifically, FIG. 3A is a side view of the airbag 200, FIG. 3B is a front view of the airbag 200, and FIG. 3C is a rear view of the airbag 200. As illustrated in FIGS. 3A-3C, the airbag 200 includes a front 302 and a back 304 opposite the front 302. The front 302 of the airbag 200 is configured to engage the back 210 of the rear-facing seat 106 when the airbag 200 is deployed. Further, the airbag 200 includes an upper portion 306 and a lower portion 308. The upper portion 306 is configured to press onto a back of the headrest 208 when the airbag 200 is deployed, and the lower portion 308 is configured to press onto a back of the seatback 206 when the airbag 200 is deployed. When the airbag 200 is deployed, the airbag 200 inflates between the rear-facing seat 106 and the panel 112 to prevent the rear-facing seat 106 from colliding with the panel 112. Further, when the airbag 200 is deployed, the lower portion 308 presses onto the back of the seatback 206 to absorb impact energy, thereby reducing an acceleration of the upper body (e.g., head, neck, chest, thorax, etc.) of the occupant 202 during the collision. Additionally, when the airbag 200 is deployed, the upper portion 306 presses onto the back of the headrest 208 to reduce rotation of the head of the occupant 202 during the collision.

As illustrated in FIGS. 3B-3C, the lower portion 308 includes sewn lines 310 that extend between the front 302 and the back 304 of the airbag 200. For example, each of the sewn lines 310 form a receded line that extends along the front 302 of the airbag 200 and an opposing receded line that extends along the back 304 of the airbag 200. The sewn lines 310 restrain a thickness of the lower portion 308 of the airbag 200 when the airbag 200 is deployed. For example, length(s) of the sewn lines 310 between the front 302 and the back 304 define the thickness of the lower portion 308 when the airbag 200 is deployed. In the illustrated example, the sewn lines 310 extend along a center section 312 of the lower portion 308 of the airbag 200 to restrain the thickness of the center section 312 of the lower portion 308 when the airbag 200 is deployed. The sewn lines 310 are configured to define a thickness of the lower portion 308 of the airbag 200 that enables the lower portion 308 to reduce an acceleration of an upper body of the occupant 202 when the lower portion 308 presses onto the seatback 206 during a collision.

As illustrated in FIG. 3A, the upper portion 306 includes one or more tethers 314 that extend between the front 302 and the back 304 of the airbag 200. For example, each of the tethers 314 form a receded point on the front 302 of the airbag 200 and an opposing receded point on the back 304 of the airbag 200. The tethers 314 are configured to restrain a thickness of the upper portion 306 of the airbag 200 when the airbag 200 is deployed. For example, length(s) of the tethers 314 between the front 302 and the back 304 define the thickness of the upper portion 306 when the airbag 200 is deployed. The thickness of the upper portion 306 defined by the tethers 314 enables the upper portion 306 to reduce rotation of a head of the occupant 202 when the upper portion 306 presses onto the headrest 208 during a collision.

As illustrated in FIG. 3B, the tethers 314 include one or more central tethers 316 that extend between the front 302 and the back 304 within a center section 318 of the upper portion 306 of the airbag 200. For example, each of the central tethers 316 form a receded point within the center section 318 on the front 302 and an opposing receded point within the center section 318 on the back 304. The central tethers 316 are configured to restrain a thickness of the center section 318 of the upper portion 306 when the airbag 200 is deployed. For example, length(s) of the central tethers 316 between the front 302 and the back 304 define the thickness of the center section 318 when the airbag 200 is deployed. The thickness of the center section 318 of the upper portion 306 that is defined by the central tethers 316 enables the center section 318 to reduce backward rotation of the head of the occupant 202 when the upper portion 306 presses onto the headrest 208 during a front-impact collision (also referred to as a front impact and a front collision).

As illustrated in FIG. 3C, the tethers 314 include one or more side tethers 320 that extend between the front 302 and the back 304 within one or more side sections 322 of the upper portion 306 of the airbag 200. In the illustrated example, one of the side sections 322 is one side of the center section 318 of the upper portion 306, and another of the side sections 322 is on an opposing side of the center section 318. Further, each of the side tethers 320 form a receded point within one of the side sections 322 on the front 302 and an opposing receded point within that one of the side sections 322 on the back 304. The side tethers 320 are configured to restrain thicknesses of the side sections 322 of the upper portion 306 when the airbag 200 is deployed. For example, length(s) of the side tethers 320 between the front 302 and the back 304 define the thickness of the side sections 322 when the airbag 200 is deployed. The thicknesses of the side sections 322 of the upper portion 306 that are defined by the side tethers 320 enable the center section 318 to reduce lateral rotation of the head of the occupant 202 when the upper portion 306 presses onto the headrest 208 during certain oblique-impact collisions (also referred to as oblique collisions and oblique impacts).

As illustrated in FIGS. 3A-3B, the airbag 200 also includes protrusions 324 that extend from the front 302 of the upper portion 306 of the airbag 200. In the illustrated example, each of the protrusions 324 extends from a respective one of the side sections 322 of the upper portion 306 of the airbag 200 to enable the protrusions 324 to extend around sides of the headrest 208 when the airbag 200 is deployed onto the back 210 of the rear-facing seat 106. The protrusions 324 are configured to extend beyond the headrest 208 on each side of the headrest 208 when the airbag 200 is deployed to control the head kinematics of the occupant 202 during certain oblique-impact collisions, such as frontal oblique impacts. For example, during certain oblique-impact collisions, one or more of the protrusions 324 engages the head of the occupant 202 to limit lateral rotation of the head.

Further, the airbag 200 of the illustrated example includes a vent that is configured to affect the inflation and subsequent deflation of the airbag 200 upon deployment. The vent is configured to affect the thickness of the upper portion 306 and/or the lower portion 308 of the airbag 200. For example, the vent is sized to (1) enable the airbag 200 to inflate upon deployment to reduce acceleration of the upper body of the occupant 202 and (2) subsequently deflate to enable the occupant 202 to safely leave the rear-facing seat after the collision has ended.

Figure 4:
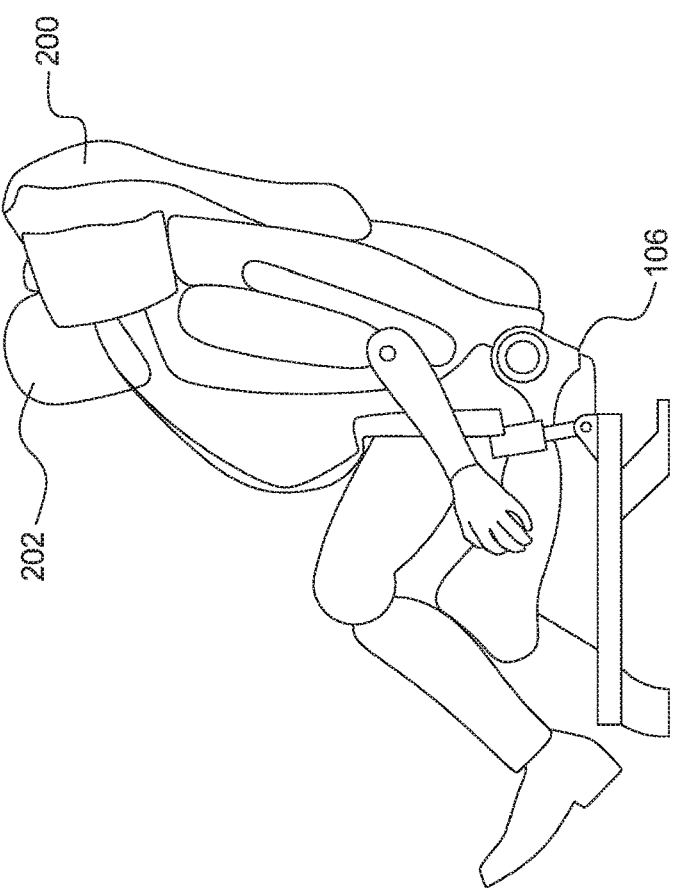
FIG. 4 depicts an occupant seated in the rear-facing seat of FIG. 1 when the airbag of FIG. 2 is deployed for a front impact.

FIG. 4 depicts the occupant 202 seated in the rear-facing seat 106 when the airbag 200 is deployed during a front-impact collision of the vehicle 100. As illustrated in FIG. 4, the airbag 200 that is deployed onto the back 210 of the rear-facing seat 106 (i) reduces acceleration of the upper body of the occupant 202 and (ii) deters backward rotation of the head of the occupant 202 during a front collision. For example, the upper portion 306 of the airbag 200 presses onto a back of the headrest 208 to control the head kinematics of the occupant 202. Further, the central tethers 316 define a thickness of the center section 318 of the upper portion 306 of the airbag 200 that facilitates the airbag 200 in reducing backward rotation of the head of the occupant 202 during a front collision. More generally, the tethers 314 define a thickness of the upper portion 306 of the airbag 200 that facilitates the airbag 200 in reducing rotation of the head of the occupant 202 during a collision. Additionally or alternatively, the lower portion 308 of the airbag presses onto the back of the seatback 206 to reduce acceleration of the upper body of the occupant 202. The sewn lines 310 define a thickness of the center section 312 of the lower portion 308 of the airbag 200 that facilitates the airbag 200 in reducing the acceleration of the upper body of the occupant 202.

Figure 5:
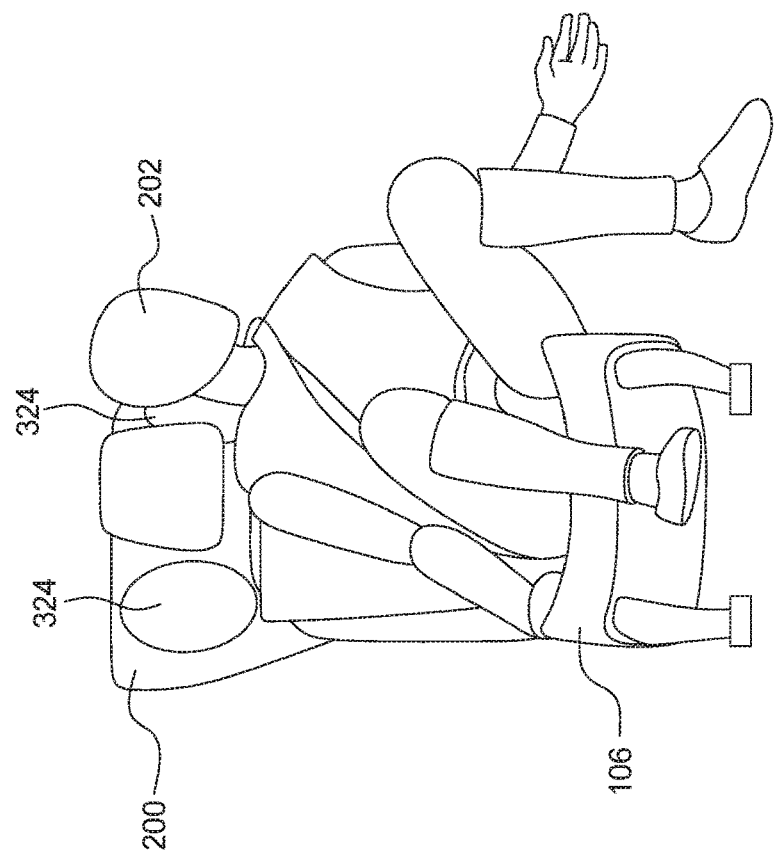
FIG. 5 depicts an occupant seated in the rear-facing seat of FIG. 1 when the airbag of FIG. 2 is deployed for a frontal oblique impact.

FIG. 5 depict the occupant 202 seated in the rear-facing seat 106 when the airbag 200 is deployed during a frontal oblique-impact collision of the vehicle 100. As illustrated in FIG. 5, the airbag 200 that is deployed onto the back 210 of the rear-facing seat 106 controls the head kinematics of the occupant 202, such as lateral head kinematics, during a frontal oblique collision. Additionally or alternatively, the airbag 200 is deployed onto the back 210 of the rear-facing seat 106 to facilitate control of the head kinematics of the occupant 202 during other oblique collisions, such as rear oblique collisions and/or lateral oblique collisions. For example, the side tethers 320 define thicknesses of the side sections 322 of the upper portion 306 of the airbag 200 that facilitates the airbag 200 in controlling the head kinematics of the occupant 202 during certain oblique collisions, such as a frontal oblique collision. Additionally or alternatively, the protrusions 324 extend beyond the headrest 208 of the rear-facing seat 106 to control the head kinematics of the occupant 202 during certain oblique collisions, such as a frontal oblique collision.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an instrument panel;
   a rear-facing seat adjacent the instrument panel and including a seatback and a headrest; and
   an airbag including a lower portion and an upper portion, wherein, when undeployed, the airbag is stored in the instrument panel,
   wherein, when the airbag deploys, the lower portion presses onto a back of the seatback and the upper portion presses onto a back of the headrest;
   wherein the airbag includes tethers between a front and a back of the upper portion, the tethers constrain a thickness of the upper portion to control head kinematics of an occupant during certain collisions; and
   wherein the tethers include side tethers on each side of the upper portion, the side tethers constrain thicknesses of side sections to control lateral head kinematics of the occupant during a frontal oblique collision.

2. The vehicle of claim 1, wherein, when the airbag deploys during a collision, the lower portion presses onto the back of the seatback to reduce acceleration of an upper body of an occupant and the upper portion presses onto the back of the headrest to reduce rotation of a head of the occupant.

3. The vehicle of claim 1, wherein the airbag is configured to deploy onto a back of the rear-facing seat for at least one of a front collision and a frontal oblique collision.

4. The vehicle of claim 1, wherein the airbag deploys onto a back of the rear-facing seat to deter the airbag from deploying onto an occupant.

5. The vehicle of claim 4, wherein, by deploying onto the back of the rear-facing seat, the airbag is able to deploy earlier at an increased velocity to further restrain the occupant during a collision.

6. The vehicle of claim 1, wherein the airbag includes sewn lines that extend between a front and a back of the airbag along a center section of the lower portion, the sewn lines constrain a thickness of the center section of the lower portion to reduce acceleration of an upper body of an occupant during a collision.

7. The vehicle of claim 1, wherein the tethers include central tethers located within a center section the upper portion, the central tethers constrain a thickness of the center section of the upper portion to control the head kinematics of the occupant during certain front collisions.

8. The vehicle of claim 1, wherein the airbag includes protrusions extending from each side of a front the upper portion, the protrusions extend beyond the headrest to control lateral head kinematics of an occupant during a frontal oblique collision.

9. The vehicle of claim 1, further including a restraint control module that controls deployment of the airbag.

10. The vehicle of claim 9, further including at least one of an inertial measurement unit, an accelerometer, and a pressure sensor to detect a collision, wherein the restraint control module deploys the airbag in response to detecting the collision.

11. An autonomous vehicle comprising:
    a rear-facing seat for an occupant that includes a seatback and a headrest; and
    an airbag including a lower portion and an upper portion, wherein, when the airbag deploys, the lower portion contacts a back of the seatback to reduce acceleration of an upper body of the occupant and the upper portion contacts a back of the headrest to control head kinematics of the occupant;
    wherein the airbag includes protrusions extending from each side of a front of the upper portion, the protrusions extend beyond the headrest to control lateral head kinematics of the occupant during a frontal oblique collision.

12. The autonomous vehicle of claim 11, further including a restraint control module that deploys the airbag for a front collision or a frontal oblique collision.

13. The autonomous vehicle of claim 11, wherein when the airbag deploys, the lower portion presses onto the back of the seatback to reduce the acceleration of the upper body of the occupant and the upper portion presses onto the back of the headrest to control the head kinematics of the occupant.

14. The autonomous vehicle of claim 11, wherein the airbag includes sewn lines that extend between a front and a back of the airbag along a center section of the lower portion, the sewn lines constrain a thickness of the center section to reduce the acceleration of the upper body of the occupant during a collision.

15. The autonomous vehicle of claim 11, the airbag includes tethers between a front and a back of the upper portion, the tethers constrain a thickness of the upper portion to control the head kinematics of the occupant during certain collisions.

16. An airbag for a seat having a seatback and a headrest, the airbag comprising:
    a front;
    a back;
    a lower portion to deploy onto the seatback and including sewn lines extending between the front and the back; and
    an upper portion to deploy onto the headrest and including:
       tethers extending between the front and the back; and
       protrusions protruding from the front of the upper portion and extending beyond the headrest when deployed.

* * * * *